United States Patent
Donoho et al.

(10) Patent No.: US 6,412,832 B1
(45) Date of Patent: Jul. 2, 2002

(54) SELF-FLARING PLASTIC FITTINGS

(75) Inventors: James Donoho, Golden Valley; Michael Stoick, Prior Lake; Eric Soderstrom, Lauderdale, all of MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 09/589,690

(22) Filed: Jun. 8, 2000

(51) Int. Cl.[7] .......................... F16L 33/16; F16L 35/00
(52) U.S. Cl. ................. 285/334.5; 285/110; 285/382.4
(58) Field of Search ............................. 285/334.5, 332, 285/382.4, 382.5, 110

(56) References Cited

U.S. PATENT DOCUMENTS

| | | | |
|---|---|---|---|
| 431,816 A | 7/1890 | Lomasney | |
| 771,682 A | 10/1904 | Sussman | |
| 1,058,542 A | 4/1913 | Brown | |
| 2,035,978 A | 3/1936 | Parker | 285/90 |
| 2,123,999 A | 7/1938 | Lauer | 285/86 |
| 2,328,469 A | 8/1943 | Laffly | 285/86 |
| 2,547,889 A | 4/1951 | Richardson | 285/86 |
| 2,641,489 A | 6/1953 | Hedberg, Jr. | 285/166 |
| 2,952,481 A | 9/1960 | Weatherhead, Jr. | 285/116 |
| 3,258,279 A | 6/1966 | Johnsen | 285/110 |
| 3,294,425 A | 12/1966 | Franck | 285/334.5 |
| 3,294,426 A * | 12/1966 | Lyon | 285/334.5 |
| 3,479,058 A * | 11/1969 | Chandler | 285/334.5 X |
| 3,615,160 A * | 10/1971 | Feather | 285/334.5 X |
| 4,076,280 A * | 2/1978 | Young | 285/334.5 X |
| 4,133,565 A | 1/1979 | Shutt | 285/334.5 |
| 5,217,261 A | 6/1993 | DeWitt et al. | 285/332.2 |
| 5,261,442 A | 11/1993 | Kingsford et al. | 137/312 |
| 5,340,121 A | 8/1994 | Lewis et al. | 277/43 |
| 5,343,738 A | 9/1994 | Skaggs | 73/40.5 |
| 5,439,259 A | 8/1995 | Taga et al. | 285/334.5 |
| 5,476,004 A | 12/1995 | Kingsford | 73/40 |
| 5,498,036 A | 3/1996 | Kingsford | 285/138 |
| 5,511,797 A | 4/1996 | Nikirk et al. | 277/204 |
| 5,645,301 A | 7/1997 | Kingsford et al. | 285/14 |
| 5,652,391 A | 7/1997 | Kingsford et al. | 73/706 |
| 5,746,555 A | 5/1998 | McEvoy | 411/14 |
| 6,179,348 B1 | 1/2001 | Okamoto | 285/334.5 |

FOREIGN PATENT DOCUMENTS

| | | |
|---|---|---|
| CH | 163639 | 11/1933 |
| DE | 821 745 | 11/1951 |
| FR | 2 385 969 | 12/1978 |
| GB | 955600 | 4/1964 |
| JP | 09229258 | 9/1997 |

* cited by examiner

*Primary Examiner*—Neill Wilson
(74) *Attorney, Agent, or Firm*—Patterson, Thuente, Skaar & Christensen, P.A.

(57) ABSTRACT

The self-flaring plastic fitting is generally utilized in coupling one section of tubing to another section of tubing. In the present invention, at least one of the sections of tubing has an end portion with a substantially uniform diameter and a groove about its periphery. The fitting itself includes a fitting body and a fitting nut. The fitting body is provided with a tapered nose section while the fitting nut is provided with a groove engaging device. In assembling the fitting, the end of the section of tubing incorporating the groove is place proximate the tapered nose section of the fitting body while the opposite end of the section of tubing is inserted through the fitting nut. The fitting nut is then pushed towards the fitting body where the groove engaging device of the fitting nut engages the groove of the tubing. As the fitting nut is joined with the fitting body, the fitting nut is drawn over the fitting body and, correspondingly, the tubing is drawn against and over the tapered nose section of the fitting body causing the tubing to flare and a seal to be created between the tapered nose section and tubing.

19 Claims, 4 Drawing Sheets

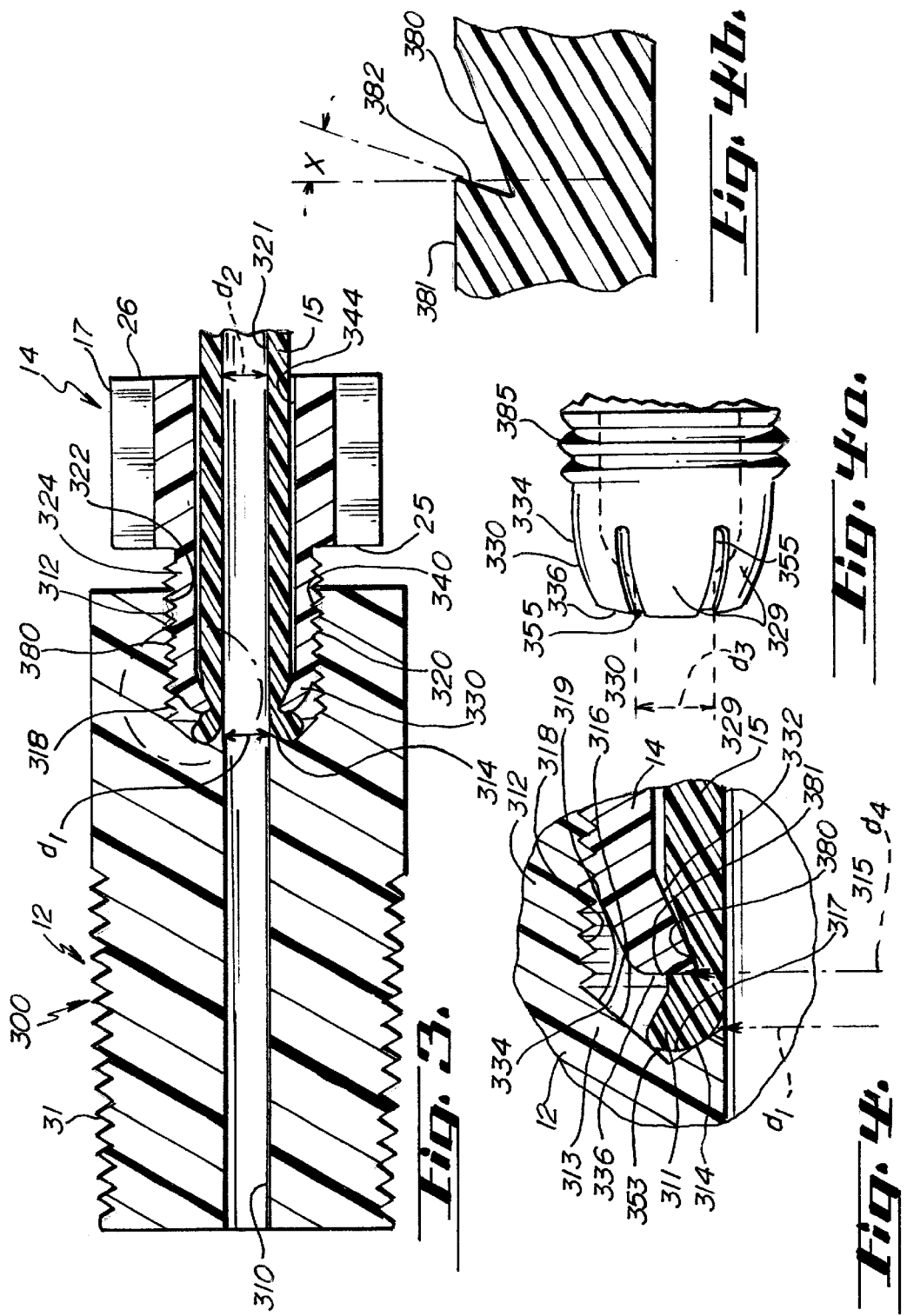

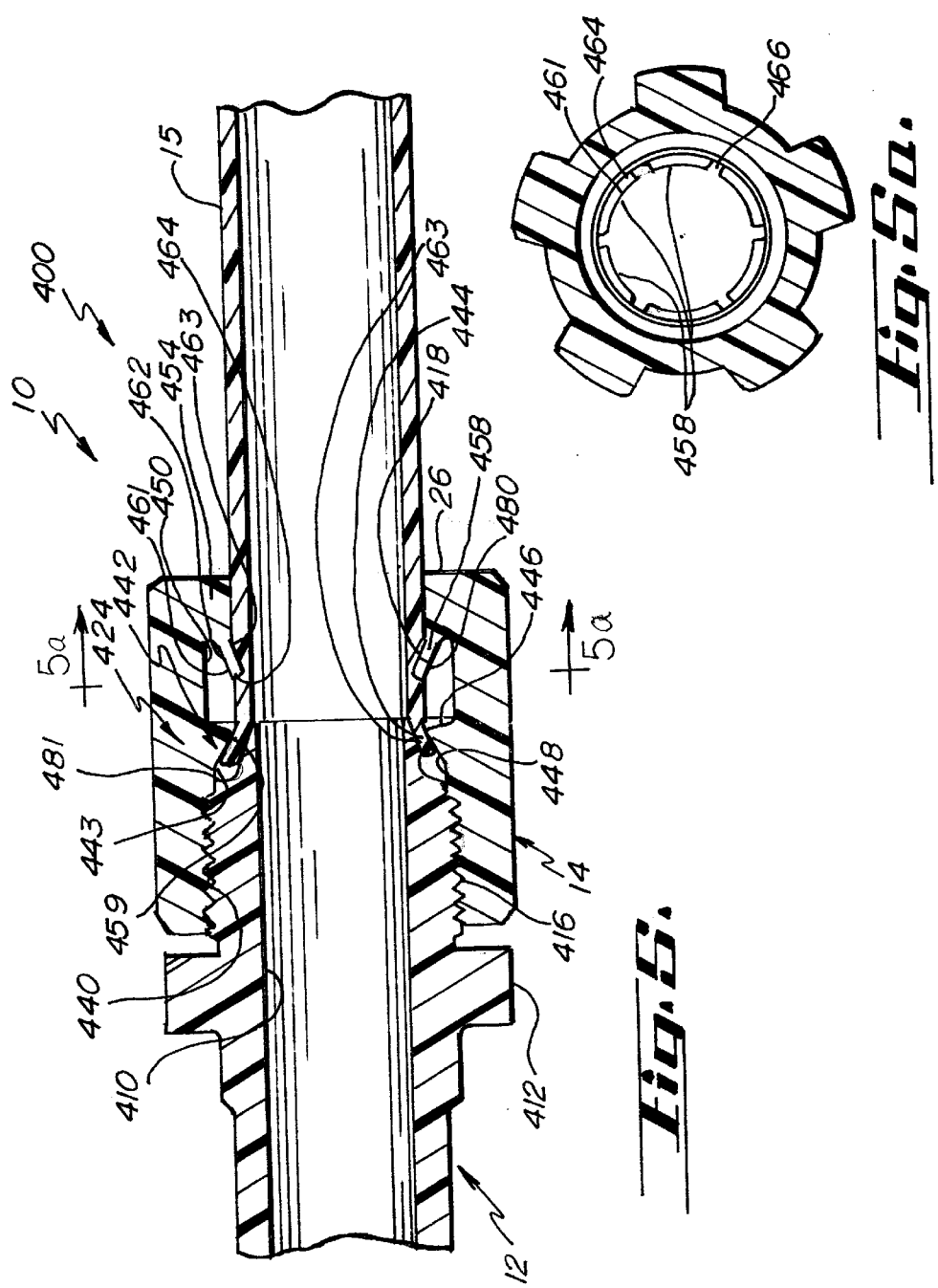

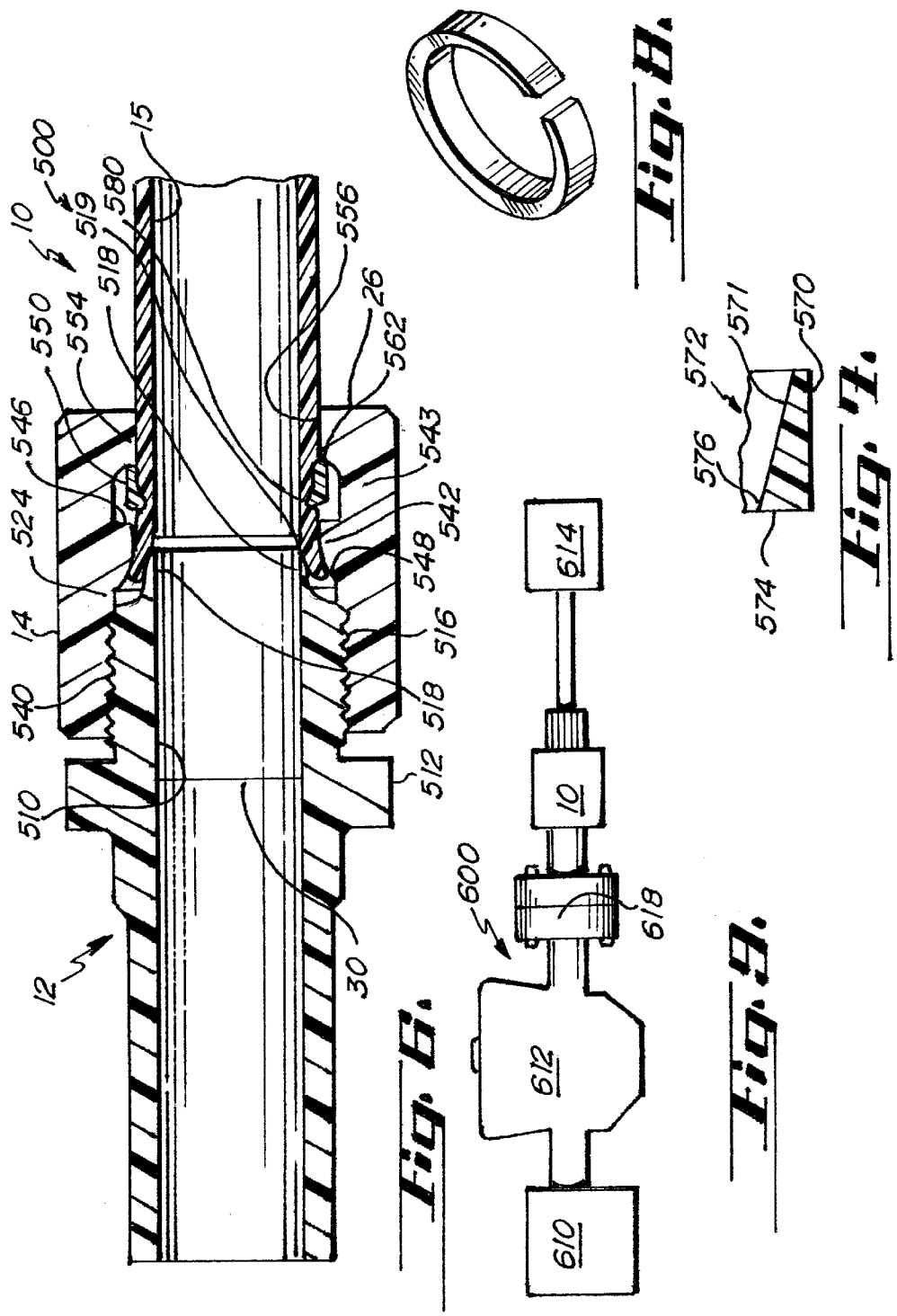

SELF-FLARING PLASTIC FITTINGS

FIELD OF THE INVENTION

The present invention relates to plastic fittings for joining sections of plastic tubing, and, more particularly, to plastic flare fittings.

BACKGROUND OF THE INVENTION

Numerous industries use metallic tubes and fittings of copper, stainless steel, steel and various metal alloys where connection of high strength and integrity are needed. Metallic plumbing is very suitable in many applications. However, in certain industries, the fluids conveyed may attack metal components and the metal can contaminate the conveyed fluids, i.e., the semiconductor processing industry. Highly inert fluoropolymers may be utilized for the fittings, tubing, and components in such applications, for example, polytetrafluoroethylene (PTFE), and perfluoroalkoloxy (PFA). To maintain a clean and non-hazardous environment, it is essential that the fittings provided for coupling to sections of tubing are not easily unintentionally disconnected and that the tubing/fitting sealing interface maintains its integrity even under mechanical stress. Various types of fittings are known in the art for these purposes.

One common fitting formed from such polymers is the FLARETEK® fitting, available from Fluoroware, Inc., the owner of the instant application. Such fittings provide for a fitting body, with an elongate cylindrical nipple, a threaded portion at the base of the nipple and that completely covers the flared section of the tubing when attached and a fitting nut that is attachable thereto. A flared end portion of tubing is placed over the elongate tapered nose section with the fitting nut thereon. The fitting nut is then threadingly engaged with the fitting body compressing the flared end onto the nipple creating a seal between fitting nut, tubing and fitting body. In order to achieve this seal, the end of the tubing placed over the elongated tapered nose section is flared, prior to assembly, to the shape of the elongate nose tapered section. The flaring of the tubing is achieved by heating the tubing, then shaping the heated tubing into the desired flared configuration by pressing the heated tubing end over an appropriate form, such that the flared shape is retained by the end of the tubing.

This step of heating to a temperature sufficient such that the tubing may be permanently deformed and shaping the tubing prior to assembly with the fitting adds time and cost to the overall tubing/fitting assembly process. As such, there is a need for a fitting that is capable of flaring the tubing itself thereby eliminating the need for the heating and shaping of the tubing prior to assembly. The flaring of the tubing is preferably achieved by virtue of the assembly of fitting to tubing and, thus, there is a need that the fitting be readily graspable and, quickly and easily joined.

SUMMARY OF THE INVENTION

The needs described above are in large measure met by a self-flaring plastic fitting of the present invention. The self-flaring plastic fitting is utilized in coupling a tubing end portion to the fitting. The tubing end portion has a substantially uniform diameter and a groove about its periphery. The fitting itself includes a fitting body and a fitting nut. The fitting body is provided with a tapered nose section while the fitting nut is provided with a groove engaging device. In assembling the fitting, the end of the tubing incorporating the groove is inserted through the nut and is placed confronting the tapered nose section of the fitting body. The fitting nut is then pushed towards the fitting body where the groove engaging device of the fitting nut engages the groove of the tubing. The fitting nut threadingly engages with the fitting body and the fitting nut is drawn inwardly toward the fitting body and, correspondingly, the tubing is drawn against and over the tapered nose section of the fitting body causing the tubing to deform in a flare and a seal to be created between the tapered nose section and flared tubing.

The groove engaging device of the fitting nut may be unitary with the fitting nut or may be distinct therefrom. In the case of a unitary configuration, the groove engaging device preferably comprises an annular collar. In the case of a distinct configuration, the groove engaging device is preferably in the form of a retaining ring. Both fitting body and fitting nut are preferably provided with features for easier grasping and handling, e.g., fitting body is preferably provided with one or more planar surfaces for grasping with a tool while fitting nut is preferably provided with a plurality of winged extensions or knurled or ribbed surfaces for easier grasping and hand assembly. The tapered nose section of fitting the body is preferably of a shortened configuration requiring a minimal flare in the tubing. And, the fitting nut is preferably provided with an intermediate collar with a pinching extension that helps to pinch the formed flare of the tubing against the tapered nose section of the fitting body.

The fitting may be part of device or component or may have connection means such as external threads, another self-flaring fitting, or a flange.

When used herein "tubing" refers to a section of tubing or a tubular end portion where the tubular end portion is part of a device or component such as a valve or other fitting. Tubing formed of PFA is highly suitable for the self-flaring applications herein. "Portion" when used herein refers to either an integral or distinct and separable member.

BRIEF DESCRIPTION OF THE DRAWINGS

FIG. 3 is a cross-sectional view of the embodiment of the self-flaring fitting of FIGS. 1 and 2.

FIG. 4 is a detailed view of a portion of the self-flaring fitting of FIGS. 1–3.

FIG. 4a is a side elevational view of groove engaging portions of a fitting nut of the present invention.

FIG. 4b is a detailed cross-sectional view of the groove of the groove engaging portion of the fitting nut of the present invention.

FIG. 5 is a cross-sectional view of an alternative embodiment of the self-flaring fitting of the present invention.

FIG. 5a is a cross-sectional view of the nut at line 5a—5a of FIG. 5.

FIG. 6 is a cross-sectional view of another embodiment of a self-flaring fitting of the present invention.

FIG. 7 is a across-sectional view of a retaining ring that is used with the self-flaring fitting embodiment of FIG. 5.

FIG. 8 is a perspective view of the retaining ring of the embodiment of FIG. 6.

FIG. 9 is a fluid flow circuit incorporating the self flaring fitting of the invention.

DETAILED DESCRIPTION OF THE PREFERRED EMBODIMENTS

Each embodiment of the self-flaring fittings of the present invention described herein provides for quicker assembly of fittings to tubing by eliminating the need for prior heating and shaping of the tubing, i.e., to form a flared shape for connecting to the tubing, and by providing a fitting that can manually, quickly, and easily be screwed onto the tubing to form an effective seal. The quick assembly of the self-flaring fitting to tubing is, at least in part, effected by virtue of the short flare of the tubing that is needed and by the reduced number of threads that are necessary to achieve this short flare.

Referring to FIGS. 1–6, different embodiments of self-flaring fittings 10 are illustrated. Each generally comprises a fitting body 12 and a fitting nut 14 to provide a self flaring connection to a tubing section end portion 15. The tubing end portion, fitting nut, and fitting body are all coaxial about axis A.

Figure 1:
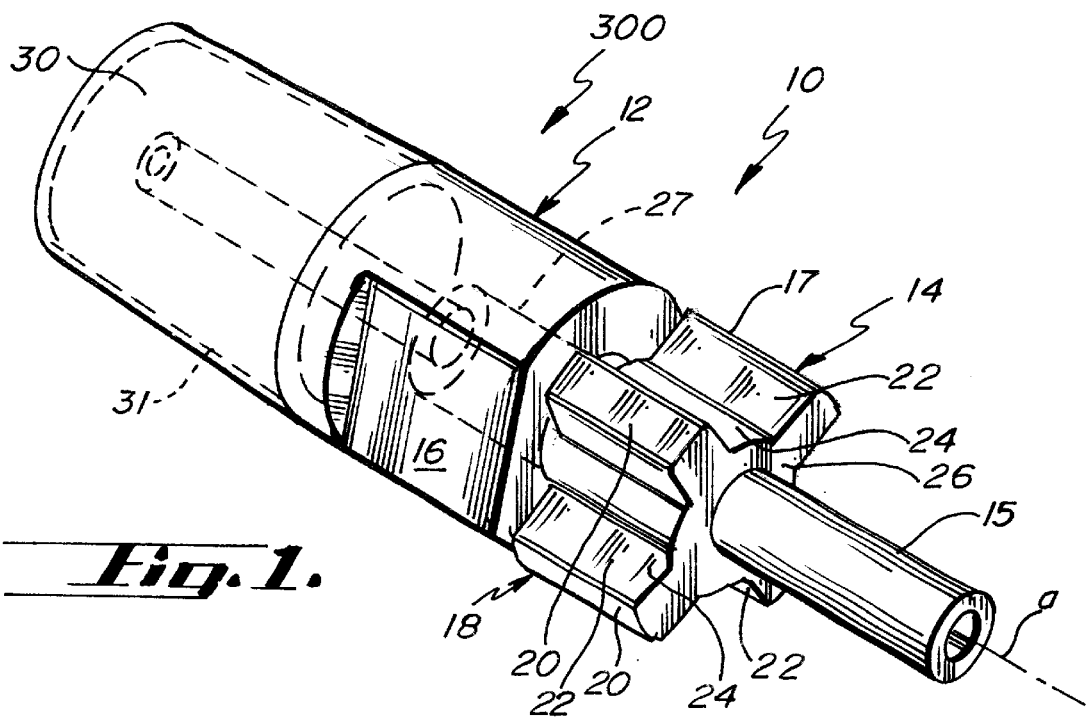
FIG. 1 is a perspective view of a self-flaring fitting with a portion of tubing connected thereto in accordance with the present invention.
Figure 2:
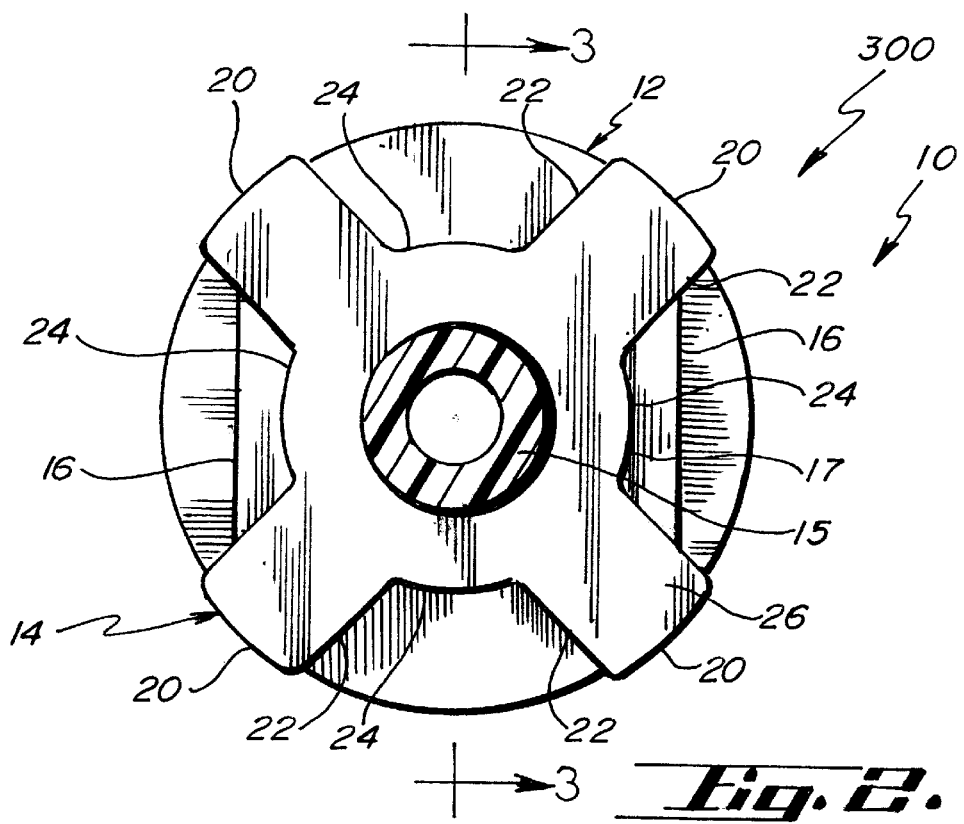
FIG. 2 is an end view of the self-flaring fitting of FIG. 1.

Referring to FIGS. 1 and 2, a first embodiment 300 of a self-flaring fitting is illustrated. The exterior of fitting body 12 typically is generally cylindrical in shape and preferably incorporates one or more planar surfaces 16 or other grasping structure for easier grasping of fitting body 12 during assembly. The non-concealed first portion 17 of the exterior of fitting nut 14 is generally cylindrical in shape but is provided with grasping portions configured as a plurality of winged extensions 18, which provide for easier grasping and turning of fitting nut 14 during assembly of self-flaring fitting 10. Each winged extension 18 generally comprises an elongate, substantially planar top face 20 and a pair of elongate, substantially parallel and planar side faces 22 that extend substantially radially outward from a plurality of elongate separator faces 24 generally normal to a pair of substantially parallel end faces 25, 26. The concealed second portion 27, shown by dashed lines, has external threads, described below with reference to FIGS. 3 and 4. The portion 30 of the fitting body opposite the fitting nut is configured as a threaded nipple with threads 31 indicated by the dashed lines. The portion of the fitting body opposite the fitting nut for the various embodiments of the invention may have any of a variety of configurations including means for connecting to an additional tubing end or component or may be integral with a tubing section or a component, for example, a valve, a tank, a filter, or a pump.

Cross-sectional views of self-flaring fitting 10 of FIGS. 1 and 2 are depicted in FIGS. 3, 4, and 4a. As shown, fitting body 12 is preferably of a unitary configuration having a fluid flow duct configured as a central bore 310 extending therethrough, an inner body portion 312, a first end 312.2, and a second end 312.4. Inner body portion 312 comprises a generally radially extending wall 313 with tapered nose 314, which presents a substantially hollow frustoconical shape, having a wedge shape in cross section, defining the central bore 310. The nose has a leading tip 315 with a minimal outer diameter $d_1$, that is sized to be substantially equal to or less than the tapered inside diameter $d_2$ at the inside surface 321 of the tubing to be self-flared. A first angular surface 316, e.g., 45° to the axis, and a second angular surface 317, define a seat configured as a circular axially extending groove 319 for receiving the tubing end 311 as it self-flares. Wall 318 is threaded at inner surface portion 322 of body portion 312.

Fitting nut 14, like fitting body 12, may be of a unitary configuration, and incorporates proximal nut portion 324. Proximal nut portion 324 is preferably defined by one or a plurality of groove engaging portions 329 configured as an inwardly converging annular collar 330. The collar 330 is preferably defined by a tapered inner face 332, a tapered outer face 334 that is substantially parallel to tapered inner face 332, and a substantially radial front face 336 that extends between inner face 332 and outer face 334, shown more clearly in FIG. 4a. Proximal nut portion 324 is further defined by a threaded outer surface portion 340 proximate the converging annular collar 330, wherein the threads of threaded outer surface portion 340 are designed to interface with the threads of threaded inner surface portion 322 of body portion 312. Fitting nut 14 further comprises an open interior configured as a central bore 344 that extends from converging annular collar 330 to end face 26.

Groove engaging portions 329 are designed to interface with a groove 380 formed in the outer surface 38 of tubing end portion 15. As FIGS. 3, 4 and 4b, depict, tubing 28 has been grooved prior to assembly with a groove tool to preferably create a substantially triangularly-shaped groove 380. In particular embodiments, the groove 380 in the tubing outer surface 381 has an undercut 385 defined by the substantially surface 381 which is at an angle and to a plane normal to the axis. Of course, other groove shapes and prong shapes may be selected without departing from the spirit or scope of the invention.

Front radial face 336 is substantially normal to the axis with optimally a slight angle rearward toward the tubing to provide a locking effect during engagement with the groove in the tubing. Similarly, the groove in the tubing may have a correspondence angle on the substantially radial face 382, forming an undercut discussed above, whereby the groove engaging members are securely captured within the groove.

In securing this first embodiment 300 of self-flaring fitting 10 to tubing, the end of tubing 28 with the groove 380 is inserted through the fitting nut 14 and may be engaged with tapered nose section 314 of fitting body 12. Fitting nut 14 is pushed toward fitting body 12 until threaded side portion 340 of inner fitting body 324 makes contact with threaded side portion 322 of fitting body 12. Fitting nut 14 is rotated such that threads of fitting body 12 and threads 385 of fitting nut 14 cooperate to draw fitting nut 14 towards fitting body 12.

As fitting nut 14 is drawn towards fitting body 12, converging annular collar 330 engages with groove 380 of tubing 28, axially pushing the end of tubing 28 over tapered nose section 314 of fitting body 12. As fitting nut 14 is drawn into fitting body 12, the end of tubing 28 is forced into a self-flaring configuration over tapered nose section 314 of fitting body 12 and into the tubing end receiving groove 319. The flare of tubing 28 is securely held in position by virtue of the collar axially compressing the self-flared tubing end 311 into said receiving groove 319 and between the collar and the fitting body. The tubing end is also under radial expansive stress into the flared shape when in the fully engaged connected position.

This particular embodiment illustrates the feature of the tubing end portion face 353 seating into the annular, axially inset groove 319 which defines a seat. The tip of the tubing is axially compressed thereby providing additional sealing integrity.

Referring to FIG. 4a, the converging annular collar 330 of the proximal nut portion 324 may have slits 355 defining a plurality of groove engaging portions 329 configured as prongs. Such independent members facilitate radial flexing of the annular collar which is particularly useful when inserting the tubing end therethrough.

Referring to FIGS. 5 and 5a, cross-sectional views of a second embodiment 400 of a cross-section of self-flaring fitting 10 are depicted. As shown, fitting body 12 is preferably of a unitary configuration having a central bore 410 extending therethrough. The unitary configuration of fitting body 12 generally includes an outer collar portion 412, which may have planar surfaces for grasping, a threaded exterior surface 416, and a tapered nose portion 418.

Fitting nut 14, like fitting body 12, is also preferably of a unitary configuration, and incorporates an proximal nut portion 424. Proximal nut portion 424 of fitting nut 14 is preferably defined by threaded inner surface portion 440, wherein the threads are sized to interface with the threads of threaded exterior surface portion 416 of fitting body 12. Proximal nut portion 424 is further preferably defined by an intermediate inwardly extending inner collar portion 442 that is adjacent threaded inner surface portion 440. Intermediate inner collar portion 442 includes a tapered cylindrical face 443, a radial surface 446 that extends to cylindrical face 444, and a cylindrical bore 448. Inner collar portion 442 operates as a pinching extension to radially clamp tubing 28 to tapered nose portion 418.

An annular aperture 450 further defines proximal nut portion 424, and separates inner collar portion 442 from a distal nut portion 454. Distal nut portion 454 includes one or more groove engaging portions 458 which extend radially inward and axially defining a conveying annular collar 461. Each groove engaging portion 458 is defined by a tapered outwardly facing surface 462, an inwardly facing surface 463, and a nose 464. The inwardly and outwardly facing surfaces 462, 463, of all the groove engaging portion(s) in combination preferably form frustoconcially shaped surfaces. As shown in FIG. 5a the annular collar may have a plurality of slits 466 defining the individual groove engaging portions configured as prongs 458. Such slits facilitate radial flexing of the groove easing insertion of the tubular end portion through the nut. The converging shape of the groove engaging portions allow substantially axial compressive loading of the gripping members and consequently secure gripping of the tubing by said portions.

Groove engaging portion or portions 458 engage a groove 480 formed in tubing 28 to which second embodiment 400 of self-flaring fitting 10 is to be connected. Tubing 28 has been grooved prior to assembly, with a conventional groove tool.

In securing second embodiment 400 of self-flaring fitting 10 to tubing 28, the end 459 of tubing 28 with the groove 480 is inserted through the nut and positioned to confront tapered nose portion 418 of fitting body 12. Fitting nut 14 is slid down the tubing to threadingly engage the threaded exterior surface portion 416 and is rotated moving same onto fitting body 12.

As fitting nut 14 is drawn towards fitting body 12, groove engaging portion or portions 458 of inner fitting portion 424 engages groove 480 of tubing 28. This facilitates the forcing of tubing 28 over tapered nose portion 418 of fitting body 12 into a self-flaring configuration. The flare of tubing 28 is securely held in position by virtue of the groove engaging portion(s) 458/groove 480 interface and by inner collar portion 442 pinching tubing 28 against tapered nose portion 418 of fitting body 12; the pinching effect and sealing effect is increased as fitting nut 14 is tightened towards stop ring 414. The fitting can be configured to have the radial face 481 provide a stop for the leading surface of the tip 459 of the end of the tubing at an optimal tightness of the fitting.

The embodiment of FIG. 5 with the intermediate collar portion of the nut provides additional sealing integrity in that the flared end of the tubing is radially compressed between the nose and said intermediate collar portion. Although said collar portion is shown as integral with the nut, it could also be distinct separable component assembleable into the nut.

Referring to FIGS. 6, 7, and 8, a third embodiment 500 of a of self-flaring fitting 10 is depicted. The cross-sectional view of FIG. 6 illustrates the interior configuration of fitting body 12 and fitting nut 14. As shown, fitting body 12 is preferably a unitary configuration having a central bore 510 extending therethrough. The unitary configuration of fitting body 12 generally includes an outer flange portion 512, a threaded portion 516, and a tapered nose portion 518. Note that the outside diameter of the tapered nose portion 518 is ideally slightly less than the inside diameter of the tubing to be joined. The tip 519 of the nose portion 518 is configured to wedge under and slide inside the tubing section.

Fitting nut 14 incorporates a proximal nut portion 524. Proximal nut portion 524 of fitting nut 14 is preferably defined by an internally threaded portion 540, wherein the threads of internally threaded portion 540 are sized to interface with the threads of threaded portion 516 of fitting body 12. Proximal nut portion 524 is further preferably defined by an intermediate collar portion 542 that is proximate internally threaded portion 540. Intermediate collar portion 542 includes a converging bore 544, a radially extending surface 546 that is substantially perpendicular to the fitting axis, and a frustoconical surface 548 that may be at approximately 45 degrees, to substantially cylindrical face 544. Intermediate collar portion 542 preferably operates as a pinching extension to compress and seal tubing 28 to tapered nose portion 518. Said compression is primarily radial and is also axial.

An annular recess 550 is positioned in the distal nut portion 543, and is positioned between intermediate collar portion 542 and a distal collar portion 554 of inner nut portion 524. Distal collar portion 554 includes a substantially cylindrical bore 556, extending from end face 26, and an annular groove 560 defined by a first surface 562 and a second surface 564.

In this embodiment the groove engaging portion 572 is comprised of a retaining ring, a separate cross-section of which is provided in FIG. 7, is adapted to fit within annular groove 560 while a proximal portion 574 of retaining ring 572 has a radially extending face and extends radially inward to grip with the tubing 28. Retaining ring 572 has a distal portion 570 with a bore 571 having an inside diameter which is suitably approximately the same as the outside diameter of the tubing. The bore at the proximal portion converges and is preferably provided with a triangularly-shaped tip 576. Of course, other tip shapes may be used without departing from the spirit or scope of the invention. Retaining ring 572 may be formed of rigid fluoropolymers such as PEEK or carbon filed TEFZEL®, an ETFE polymer available from Dupont.

Retaining ring 572 is sized to interface with a groove 580 that is preferably formed in a tubing 28 to which the self-flaring fitting 10 is to be connected. The tubing 28 has been grooved prior to assembly, with a grooving tool known in the art to create a triangular-shaped groove 580 at approximate distance from the end of the tubing. Of course, other groove shapes may be selected without departing from the spirit or scope of the invention.

In securing first embodiment 500 of self-flaring fitting 10 to tubing 28,the tubing 28 is inserted through fitting nut 14, and the end of tubing 28 with groove 580 is placed facing tapered nose portion 518 of fitting body 12. To the extent that is possible, tubing 28 is manually started over tapered nose portion 518. The nut 14 is pushed toward fitting body 12 until threaded side portion 516 of fitting body 12 makes contact with threaded side portion 546 of fitting nut 14.

Fitting nut 14 is preferably then manually rotated such that threads of fitting body 12 and fitting nut 14 act to draw fitting nut 14 towards stop ring 514.

As fitting nut 14 is drawn towards stop ring 514, tip 576 of proximal portion 574 of retaining ring 572 engages groove 580 of tubing 28. The engagement of tip 576 with groove 580 facilitates the drawing of tubing 28 further over tapered nose portion 518 of fitting body 12 to force the end of tubing 28 into a self-flaring configuration over tapered nose portion 518 of fitting body 12. The flare of tubing 28 is securely held in position by virtue of the tip 576/groove 580 interface and by virtue of lower wall 548 of intermediate collar portion 542 pinching tubing 28 against tapered nose portion 518 of fitting body 12; the pinching effect is increased as fitting nut 14 is drawn towards stop ring 514.

It should be noted that the embodiments disclosed provide for fluid flow ducts in the fitting which are substantially of the same diameter, and thus are as the tubing end portion to be joined. Preferably, the minimal cross-sectional area of flow duct, typically defined by the diameter $d_1$, will be at least 85% of the area of the tubing end portion, defined by diameter $d_2$.

Referring to FIG. 9, a fluid flow circuit 600 suitable for the invention herein is illustrated with circuit components 610, 612, 614 including a valve 612 with a connection means 618 comprising a flange. Component 610 may be, for example, a source of highly caustic fluid. The component 614 may be, for example, equipment for semiconductor processing. The components are all formed of chemically inert materials. The self-flaring coupling provides coupling means to connect particular components 612, 614 through unprepared tubing 613 with a high level of integrity both from a fluidic seal perspective and a mechanical strength perspective.

Moreover, the various aspects of the embodiments of the invention herein may be used with aspects of the inventions disclosed in copending applications, owned by the owner of this application, Ser. Nos. 09/590,544, 09/590,328 filed on the same date as this application and with the same inventors. These applications, entitled Torque Confirmation Fitting and Plastic Fitting for Flared Tubing, are hereby incorporated herein by reference.

In the preferred embodiments, the tubing and all or substantially all of the fitting will be formed from fluoropolymers, for example PFA. In particular embodiments, where the groove engaging portion is a distinct member, other more rigid materials, preferably chemically inert materials, i.e. PEEK, may be appropriate. For the self-flaring of the tubing to be effective for forming a secure mechanical and fluidic seal, the tip of the tubing needs to radially deform. Associated with the flaring of the tubing end, the tapered nose of the fitting body will typically show some radial compression. Operations may be performed on the tip of the tubing to facilitate this deformation or the initial engagement with the tapered nose and still be within the scope of this invention. For example, shaping the tip by rounding or removing the corner between the bore of the tubing and face of the tubing, or reducing the wall thickness at the tip by removing material from the interior or exterior surfaces, can facilitate initial insertion of the tapered fitting nose and the self flaring. Also, several annular exterior grooves may be utilized with several axially spaced groove engaging members to accomplish the gripping of the tubing by the nut. Such multiple grooves would facilitate utilizing grooves of lesser depth for providing the same axial compression of the tubing by the nut. In addition, warming the tip of the tubing to temporarily reduce its tensile strength and facilitate the flaring deformation when and as the fitting is assembled is also contemplated.

In certain applications different portions of the fitting body may be formed from differing materials and combined by simple assembly or in some configurations overmolding may be appropriate. See U.S. Pat. No. 5,837,180 assigned to owner of this application, and hereby incorporated by reference.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A self-flaring plastic fitting for coupling to an end portion of plastic tubing, the tubing having a substantially uniform outer diameter and a substantially uniform inner diameter and wherein said end portion of said tubing has an external annular groove, said fitting comprising:

a plastic fitting body having a bore extending therethrough, having an integral tapered nose section sized to fit within the end portion of the tubing, and having an integral threaded portion; and a plastic fitting nut having an integral threaded portion for engaging with the threaded portion of the fitting body, said plastic tubing insertable within said fitting nut, said fitting nut having at least one integral annular groove engaging portion extending radially inward;

wherein upon insertion of said tubing within said fitting nut and the threaded engagement of said fitting nut to said fitting body, said groove engaging portion of said fitting nut engages said groove of said tubing and the continued threaded engagement of said fitting nut to said fitting body causes said end portion of said tubing to flare over said tapered nose section of said fitting body.

2. The self-flaring plastic fitting of claim 1, wherein said groove engaging portion includes a plurality of groove engaging prongs each groove engaging prong extending inwardly to define an inner diameter less than the outer diameter of the tubing.

3. The self-flaring plastic fitting of claim 1, wherein said tubing end has an end face and wherein said fitting body has a radially extending wall with an annular seat inset therein for receiving in axial compression said end face.

4. A self-flaring fitting for coupling to an end portion of plastic tubing, the tubing having a substantially uniform outer diameter and a substantially uniform inner diameter and wherein said end portion of said tubing has an external annular groove, said fitting comprising:

a fitting body having a bore extending therethrough, having a tapered nose section sized to fit within the end portion of the tubing, and having a threaded portion;

a fitting nut, comprised of a proximal nut portion, an intermediate portion, and a distal portion, and wherein the nut's threaded portion, for engaging with the threaded portion of the fitting body, is positioned at said proximal nut portion, and the groove engaging portion is positioned at the distal end, said plastic tubing insertable within said fitting nut, said fitting nut having at least one annular groove engaging portion extending radially inward; and wherein upon insertion of said tubing within said fitting nut and the threaded engagement of said fitting nut to said fitting body, said groove engaging portion of said fitting nut engages said groove of said tubing and the continued threaded engagement of said fitting nut t said fitting body causes said end portion of said tubing to flare over said tapered nose section of said fitting body.

5. The self-flaring fitting of claim 6, wherein the nut further comprises an intermediate inner collar portion at the intermediate portion whereby said collar portion is positioned to radially compress the flared end portion of the tubing between said collar portion and the tapered nose section.

6. A self flaring plastic fitting for connection to a tubing end portion having an annular groove in the exterior surface of the end portion, the fitting comprising a plastic fitting body with an integral threaded portion and a tapered nose portion, the fitting further comprising a plastic fitting nut with an integral cooperating threaded portion and an integral compression member for radially clamping the tubing end portion to the tapered nose portion.

7. A method of coupling a tubing end portion wherein said tubing end portion has a substantially uniform diameter and wherein said end portion of said first section of tubing is prepared by creating an undercut groove about its periphery, and wherein said self-flaring flaring fitting has a fitting body with a tapered nose section and a fitting nut with a groove engaging portion, the method comprising the steps of:

inserting the tubing end portion through said fitting nut;

placing said end portion of first section of tubing proximate said tapered nose section;

engaging the groove engaging portion with the groove in the tubing end portion;

threadably joining said fitting nut to said fitting body by rotating said fitting nut, whereby said fitting nut is drawn to said fitting body; and the end portion is forced over said tapered nose section thereby flaring the tubing end portion.

8. A combination fitting and tubing section, the tubing section having tubing end portion, the tubing end portion having an end face, an uniform outside diameter, a uniform inside diameter, and an exterior undercut groove spaced from the end face, the fitting comprising:

a fitting body having a fluid flow duct axially extending therethrough, a threaded portion, and a tapered nose extending around the fluid flow duct, the tapered nose sized to be received inside the tubing end portion; and a fitting nut sized for extending around the tubing section, the fitting nut comprising an integral threaded portion for engaging with the threaded portion of the fitting body, and a groove engaging portion sized to engage the groove in the tubing.

9. The combination of claim 8, wherein the threaded portion of the fitting body has threaded facing radially inward and the threaded portion of the fitting nut has threads facing radially outward.

10. The combination of claim 8 wherein the threaded portion of the fitting body has threaded facing radially outward and the threaded portion of the fitting nut has threads facing radially inward.

11. The combination of claim 8 wherein the fitting body further comprises a seat for seating the end face of the tubing end portion.

12. The combination of claim 8 wherein the groove engaging portion comprises a plurality of groove engaging prongs.

13. The combination of claim 12 wherein the groove engaging portion is integral with the threaded portion of the fitting nut.

14. The combination of claim 8 wherein the fitting nut comprises a collar positioned for pinching the tubing end portion between said collar and the nose.

15. The combination fitting and tubing section of claim 8 wherein the nut is comprised of a proximal nut portion, an intermediate portion, and a distal portion, and wherein the nut's threaded portion, for engaging with the threaded portion of the fitting body, is positioned at said proximal nut portion, and the groove engaging portion is positioned at the distal end.

16. A method of coupling a tubing end portion wherein said tubing end portion has a substantially uniform diameter and wherein said end portion of said first section of tubing is provided with a groove about its periphery, and wherein said self-flaring fitting has a fitting body with a tapered nose section and a fitting nut with a groove engaging portion, the method comprising the steps of:

inserting the tubing end portion through said fitting nut;

placing said end portion of first section of tubing proximate said tapered nose section;

engaging the groove engaging portion with the groove in the tubing end portion;

threadably joining said fitting nut to said fitting body by rotating said fitting nut, whereby said fitting nut is drawn to said fitting body and the end portion is forced over said tapered nose section thereby flaring the tubing end portion, and rotating the fitting nut until an end face of the fitting is seated on a seat in the fitting portion.

17. A process for coupling a plastic tubing end portion to a plastic fitting body, the fitting body having an axis, a fluid flow duct positioned on the axis, a first end connectable to a component, and a second end for coupling to the tubing end portion, the second end having a nose with converging lower surface extending around the fluid flow duct, and a threaded portion, the tubing end portion having an end face, an uniform inside diameter and an uniform outside diameter, the method comprising the steps of:

cutting an annular exterior groove on the tubing spaced from the end face;

inserting the tubing end portion through a nut having a groove engaging portion and a threaded portion;

positioning the tubing end face in confronting relationship with the fitting body nose;

engaging the threaded portion of the nut with the threaded portion of the fitting body; and engaging with groove engaging portion of the nut with the groove in the tubing end portion, and forcing the tubing end portion over the nose by rotating the nut thereby flaring the tubing end portion.

18. The method of claim 17 further comprising the step of rotating the nut until the end face of the tubing end portion seats on a seat within the fitting body and an end face of the fitting is seated on a seat in the groove.

19. The process of claim 17 further comprising the step of undercutting the annular exterior groove.

* * * * *